United States Patent [19]

Dickerhoff

[11] 4,136,748
[45] Jan. 30, 1979

[54] ROLLER-TYPE ROCK BIT AND BEARING ARRANGEMENT THEREFOR

[75] Inventor: Ronald P. Dickerhoff, Louisville, Ohio

[73] Assignee: The Timken Company, Canton, Ohio

[21] Appl. No.: 848,801

[22] Filed: Nov. 7, 1977

[51] Int. Cl.² .............................................. E21B 9/08
[52] U.S. Cl. .................................... 175/337; 175/372; 308/8.2
[58] Field of Search ............... 175/337, 366, 370, 372, 175/337; 308/8.2

[56] References Cited

U.S. PATENT DOCUMENTS

| | | | |
|---|---|---|---|
| 1,858,980 | 5/1932 | Behnke | 175/372 X |
| 2,076,000 | 4/1937 | Reed | 308/8.2 |
| 2,126,040 | 8/1938 | Reed | 308/8.2 |
| 3,179,189 | 4/1965 | Goodwin | 175/372 X |
| 3,193,028 | 7/1965 | Radzimovsky | 175/372 |
| 3,365,247 | 1/1968 | Ferrand | 175/372 X |
| 3,550,972 | 12/1970 | Coski | 308/8.2 |
| 3,720,274 | 3/1973 | McCallum | 175/372 |
| 3,847,235 | 11/1974 | Goodfellow | 308/8.2 |

*Primary Examiner*—Ernest R. Purser
*Assistant Examiner*—Richard E. Favreau
*Attorney, Agent, or Firm*—Gravely, Lieder & Woodruff

[57] ABSTRACT

A roller-type rock bit has a body which fits into a drill hole and is provided with inwardly directed spindles about which cone-shaped cutters revolve. Between each spindle and its cutter is a tapered roller bearing, a flat thrust bearing, and a sleeve-type radial bearing arranged in that order from the large end of the cutter. The raceways of the tapered roller bearing converge toward the small end of the cutter, and that bearing is unitized by a thrust rib located on the spindle opposite the small ends of the rollers and a rib ring which fits into the cutter opposite the large diameter ends of the rollers. Thus, a major portion of the radial load encountered in drilling is taken by the tapered roller bearing, as well as a significant portion of the thrust load, with both of those loads being transferred between the raceways generally transversely through the tapered rollers. Any thrust loading in the opposite direction is transferred between the rib ring and the thrust rib generally axially through the rollers. The rib ring further closes the end of the cutter and, together with a stream of air that flushes the interior of the cutter, prevents rock cuttings from entering the cutter and damaging the bearings.

10 Claims, 5 Drawing Figures

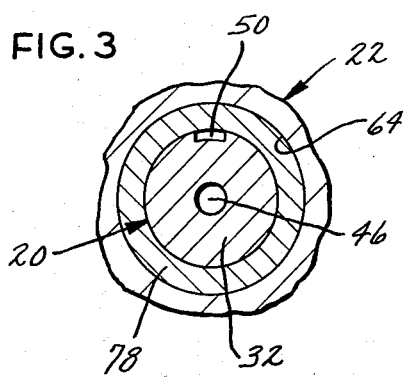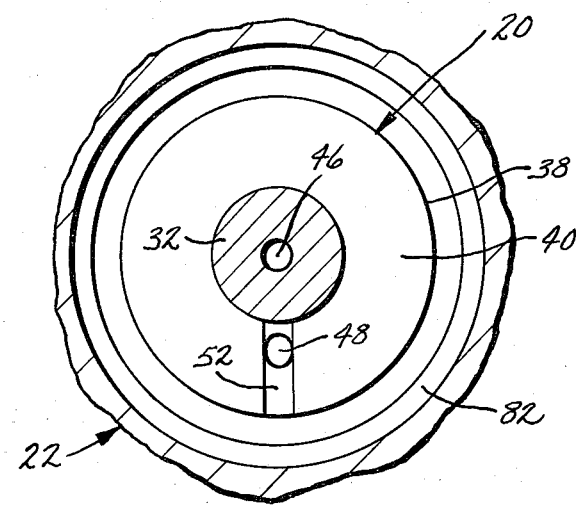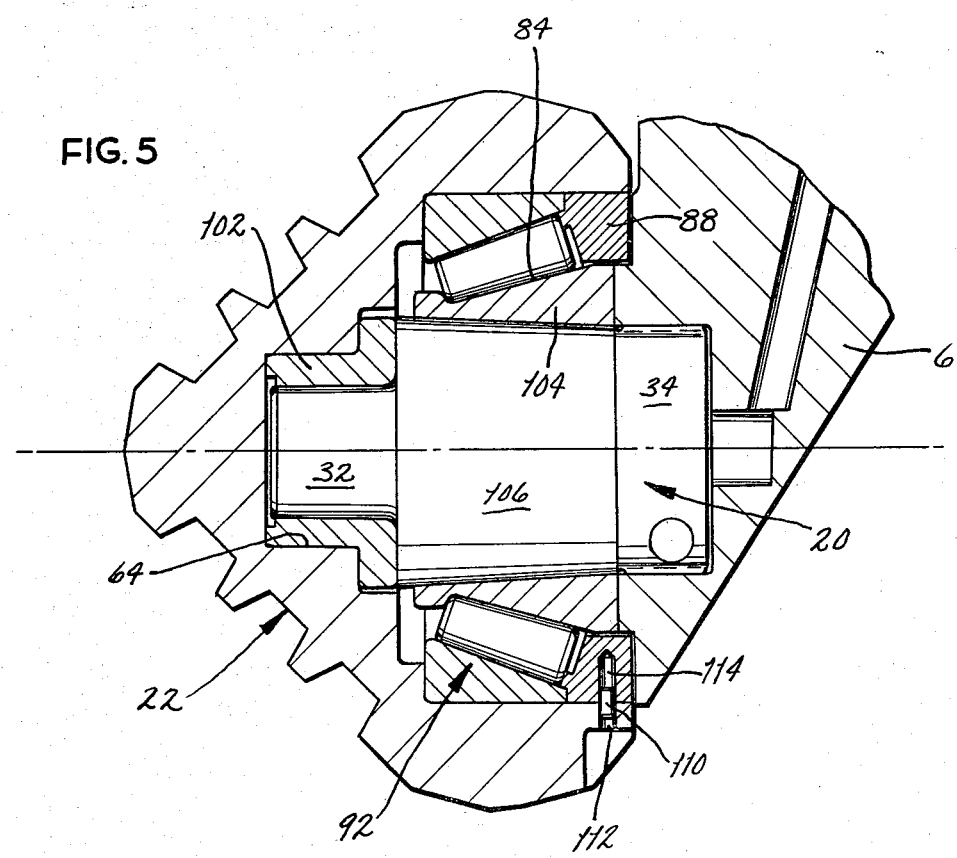

ROLLER-TYPE ROCK BIT AND BEARING ARRANGEMENT THEREFOR

BACKGROUND OF THE INVENTION

This invention relates in general to roller-type rock bits and more particularly to a rock bit in which the cutters revolve on tapered roller bearings.

Oil and gas wells as well as large water supply wells and other deep holes in soft, medium, and even hard rock formations are drilled with roller-type rock bits. The typical bit of this nature has a body with three legs projected downwardly from it, and each leg has an inwardly directed spindle about which a cone-shaped cutter revolves. The cutter has teeth on its exterior and, when used, is subjected to both radial and thrust loads. As a consequence both radial and thrust bearings exist between each cutter and the spindle about which it revolves.

The body of the bit attaches to the end of a drill rod, and as that shaft rotates the cutters bear against the rock and produce a drill hole. Actually the cutters roll against the bottom of the drill hole and in effect chisel, crush, chip and otherwise gnaw away at the rock formation so as to make the hole deeper. For a roller-type rock bit to operate effectively, its cutters must bear against the rock with considerable force. At shallow depths this force is derived from hydraulic cylinders which urge the drill rod downwardly. At greater depths the weight of the drill rod itself supplies the necessary force. In either case the force is substantial, and this, coupled with the severe environmental conditions that are encountered, causes the bearings by which the cutters are mounted on their respective spindles to fail, often long before the cutters themselves wear out.

In conventional roller-type rock bits, the cone-shaped cutters are mounted on their respective spindles by a combination of cylindrical roller bearings, ball bearings, and plain thrust bearings. The cylindrical roller bearing takes radial loading only, while the plain thrust bearing takes only thrust or axial loading. The ball bearing, on the other hand, is configured to take both radial and thrust loading, but the balls of this bearing, support loads only at points along their raceways. As a consequence, severe stresses develop along these raceways. Also, at the plain thrust bearing high friction develops at the mating surfaces of the bearing. Consequently most failures occur in the ball and plain thrust bearing. Once the bearings of a conventional roller-type bit fail the bit is discarded for it is practically impossible to disassemble the bit for replacement of the bearings.

A single tapered roller bearing has the capacity for taking both radial and thrust loads. Heretofore attempts have been made to mount the cone-shaped cutters on their spindles with tapered roller bearings and thereby take advantage of this capacity, but these attempts have been generally unsuccessful, resulting in mountings that were overly complex or else difficult to keep free of rock cuttings. U.S. Pat. Nos. 3,193,028 and 3,847,235 illustrate such mountings.

SUMMARY OF THE INVENTION

One of the principal objects of the present invention is to provide a roller-type bit, the cone-shaped cutters of which are mounted by means of a bearing arrangement which is less susceptible to failure. A further object is to provide a bit of the type stated having cone-shaped cutters that are mounted on supporting spindles principally by single row tapered roller bearings which are unitized and constructed to accommodate thrust as well as radial loads applied to the cutters. An additional object is to provide a bit of the type stated in which the tapered rollers are retained in place by a removable rib ring against which the large diameter ends of the rollers bear. Still another object is to provide a bit of the type stated in which the spindle about which each roller cutter revolves is easily detached from its leg to facilitate disassembly. Yet another object is to provide a roller type rock bit of the type stated having cutters, the interiors of which remain substantially free of rock cuttings. These and other objects and advantages will become apparent hereinafter.

The present invention is embodied in the improvement to a roller-type rock bit, with that improvement comprising a spindle on the body of the bit, a cutter surrounding the spindle, tapered raceways fixed in position with respect to the spindle and cutter, a single row of tapered rollers between the raceways, a first rib on the spindle and located opposite one end of the row of tapered rollers, and a second rib on the cutter and located opposite the other end of the row of tapered rollers, so that the bearing formed by the raceways, rollers, and thrust ribs will take thrust loading in both axial directions. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 3 is a sectional view taken along line 3—3 of FIG. 2;

FIG. 4 is a sectional view taken along line 4—4 of FIG. 2; and

FIG. 5 is a sectional view of a modified cutter and spindle.

DETAILED DESCRIPTION

Figure 1:
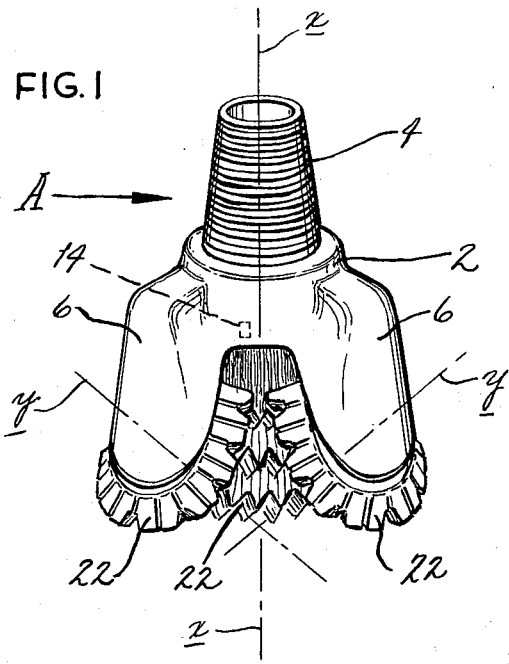
FIG. 1 is a perspective view of a roller-type bit constructed in accordance with the present invention.

Referring now to the drawings (FIG. 1), A designates a roller-type rock bit suitable for use in drilling holes in rock formations. The bit A attaches to the lower end of a hollow drill rod and is maintained against the bottom of the drill hole with considerable force applied through the drill rod. Externally, the bit A appears the same as conventional roller-type rock bits, for the differences reside internally, primarily in the bearing arrangement by which the cutters of the bit A are mounted.

Like conventional bits, the bit A includes (FIG. 1) a steel body 2 having a shank 4 projected from its upper end, with the shank 4 being concentric about the axis X of rotation for the bit A and configured to connect with the lower end of a drill rod (not shown). At its lower end the body 2 has three legs 6 which are arranged at 120° intervals and constitute distinct projections in the axial and radial directions. Actually, the body 2 has three basic segments with each segment consisting of a leg 6 and one-third of the shank 4. The three segments are secured together at the shank 4 for example as illustrated in U.S. Pat. No. 2,086,397. Each leg 6 has a planar inside face 8 (FIG. 2) that is located at an oblique angle with respect to the axis X and a cylindrical socket 10 which opens out of the face 8. Below the socket 10 is a slot 11 which opens downwardly. The shank 4 is hollow and open at its upper end so that it is in communication with the interior of the hollow drill rod. Each leg 6 contains a duct 12 which extends between the hollow interior of the shank 4 and the socket 10 in that leg 6. Each leg 6 also contains a nozzle 14 which communicates with the hollow interior of the shank 4 and is directed into the space between the three legs 6. Thus, compressed air supplied through the interior of the drill rod will flow into the shank 4 and from there some of the air will be diverted through the ducts 12 to the sockets 10, while the remainder will discharge from the nozzles 14 as air blasts.

The legs 6 have spindles 20 projected inwardly therefrom toward the axis X, there being a single spindle 20 on each leg 6 (FIG. 2) and these spindles have their axes Y perpendicular to the respective planar faces 8 from which they project. Each spindle 20 serves as a mount for a coneshaped cutter 22 which revolves about the spindle 20, its axis of rotation being the axis Y for that spindle 20. The spindles 20 and their respective cutters 22 are identical and, therefore, the spindle 20 and cutter 22 for only one leg 6 will be described in detail.

The spindle 20 (FIG. 2) has an enlarged intermediate portion 30, a cylindrical journal 32 projected from one end of the intermediate portion 30, and a cylindrical mounting stub 34 projected from the other end of the intermediate portion 30. On its exterior surface, the intermediate portion 30 has a tapered raceway 36 and a thrust rib 38 at the small diameter end of the raceway 36. At one end of the intermediate portion 30 is a front shoulder 40 which is adjacent to the journal 32, while the other end has a rear shoulder 42 which is adjacent to the stub 34. Both shoulders 40 and 42 are perpendicular to the spindle axis Y. The mounting stub 34 fits snugly into socket 10 sufficiently to enable the rear shoulder 42 to abut against the planar face 8 on the leg 6, and the stub 34 is secured to the leg 6 by a pin 44 which extends transversely through the lower end of the leg 6 and the stub 34, with the pin 44 being offset from the axis of spindle 20. The pin 44 is easily removed with a pin punch to free the spindle 20 so that it may be detached from the leg 6. The spindle 20 has a centered axial passage 46 which extends completely through it and a lateral passage 48 which extends from the passage 46 to the front shoulder 40 on the intermediate portion 30. Hence, pressurized air supplied to the socket 10 flows through the passages 46 and 48 in the spindle 20 and is discharged from the spindle 20 at the end of the journal 32 and the front shoulder 40. To enable this air to escape over the spindle 20, the journal 32 contains an axial slot 50 (FIG. 3), while the shoulder 40 contains a radial slot 52 (FIG. 4). The latter intersects the end of the passage 48.

The cone-shaped cutter 22 fits over the spindle 20 and its exterior surface is composed of a multitude of teeth 60 projected from it. These teeth 60 may assume various configurations and may be arranged in various patterns, but this is not part of the invention. In any event the taper of the exterior surface for the cutter 22 is such that the lowermost area of that surface is generally horizontal. It is this area which bears against the bottom of the drill hole and actually cuts the rock.

The cutter 22 contains a large cavity 62 (FIG. 2) which opens out of the back of the cutter 22, and this cavity possesses a stepped configuration. More specifically, the cavity 62 is composed of a small forward bore 64 that surrounds the journal 32 on the spindle 20, an intermediate bore 66 that also surrounds the journal 32, and a large rear bore 68 that opens out of the back face of the cutter 22. The forward and intermediate bores 64 and 68 are separated by a shoulder 70 that is squared off with respect to the axis Y and is located opposite the shoulder 40 on the spindle. The intermediate and rear bores 66 and 68, on the other hand, are separated by a step 72 and a shoulder 74. Furthermore, the rear bore 68 at its outer end has threads 76 cut into it.

Pressed into the small forward bore 64 is a plain radial or sleeve bearing 78 (FIG. 2) that has a cylindrical inner surface sized to fit over the journal 32 on the spindle 20 so that the bearing 78 will rotate freely on the journal 32 and transfer radial loads applied to the front of the cutter 22 to the journal 32. The intermediate bore 66 has a flat plain or thrust bearing 80 of annular configuration pressed into it, and that bearing has a flat bearing surface which bears against the front shoulder 40 on the spindle 20. Finally, the large rear bore 68 has a tapered roller bearing cup 82 pressed into it ahead of the threads 76, with the back face of the cup 82 being against the outer shoulder 74. The cup 82 has an inwardly presented tapered raceway 84 located direclty outwardly from the tapered raceway 36 on the spindle 20. The tapers of the two raceways 36 and 84 are such that the raceways 36 and 84 if continued down to their individual apices, intersect the axis Y of the spindle 20 at a common point.

Figure 2:
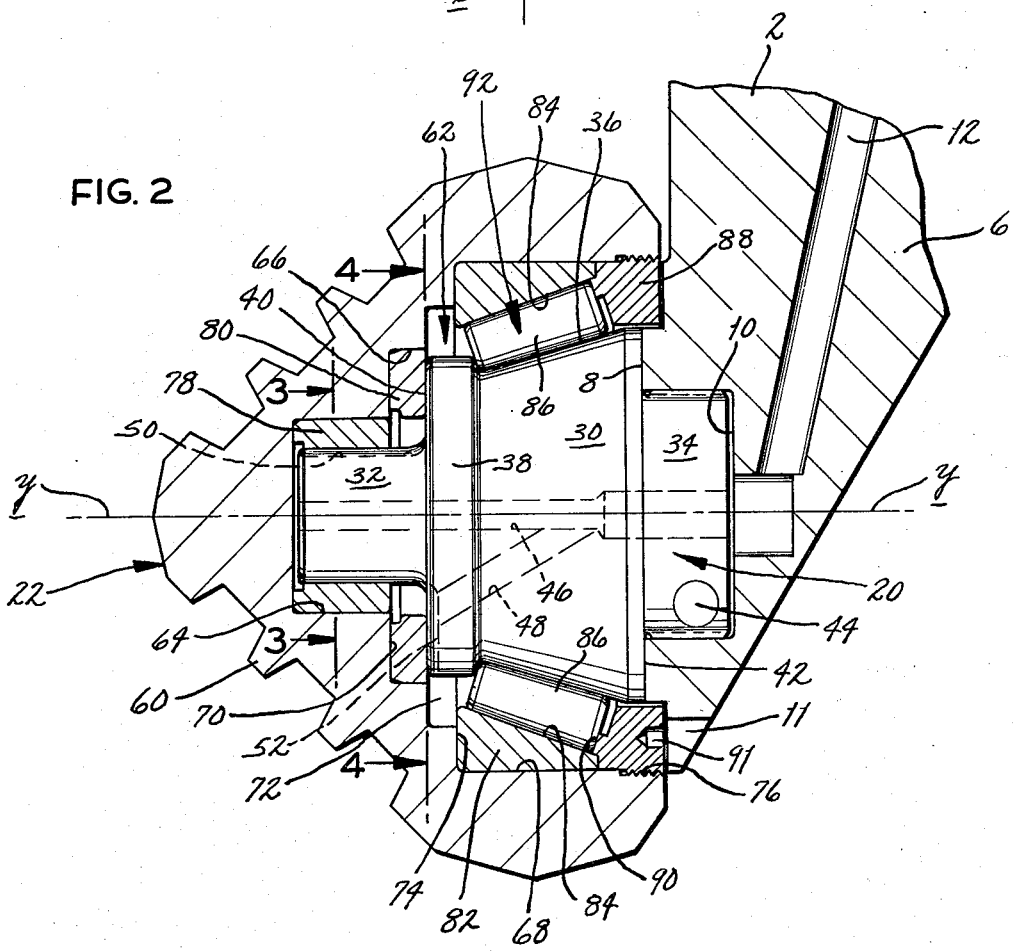
FIG. 2 is a sectional view showing one of the cutters, the spindle on which it is mounted, the bearings between the spindle and cutter, and a portion of the leg from which the spindle projects.

Interposed between the two raceways 36 and 84 are a plurality of tapered rollers 86 (FIG. 2). Indeed, the space between the raceways 36 and 84 is packed with the largest number of rollers 86 possible so as to provide maximum load bearing capabilities, and this precludes installation of the usual cage for separating the rollers 86.

Finally, the large rear bore 68 also contains a backing or rib ring 88 (FIG. 2) that engages the threads 76 and is threaded down against the front face of the cup 82 to clamp the cup 82 against the shoulder 74 in the cutter 22. The rib ring 88 has a thrust rib 90 formed integral with it, and that rib 90 projects generally axially a short distance along the raceway 84 where the large diameter and faces of the tapered rollers 86 bear against it. The rib 90 prevents the rollers 86 from being expelled from the space between the two raceways 36 and 84 when radial loads are applied to them, and further orients the rollers 86 so that they do not become skewed with respect to the axis Y. On its back face the rib ring 88 has a small axial hole 91 that will align with and be exposed through the slot 11 in the leg 6 when the cutter 22 is rotated to the proper position.

The raceway 84 on the cup 82, the raceway 36 and thrust rib 38 on the intermediate portion 30 of the spindle 20, the tapered rollers 86, and the thrust rib 90 on the rib ring 88 in combination form a single row tapered roller bearing 92 that is unitized and therefore is capable of accommodating radial loads, as well as thrust loads in both directions along with the axis Y, that is, toward the leg 6 and away from the leg 6. Moreover, the bearing 92 is oriented such that it will accommodate the heaviest thrust loading in the direction which urges the cutter 22 toward the leg 6, for that is the direction in which the load tends to seat the rollers 86 against the raceways 36 and 84, thereby enabling the rollers 86 to transfer the thrust load generally transversely through them, that is from the raceway 84 to the raceway 36. A thrust load applied in the opposite direction, that is, in the direction which tends to withdraw the cutter 22 from the spindle 20, causes the rollers 86 to lodge between the thrust rib 90 and the thrust rib 38, so that the thrust load in that instance in transmitted generally axially through the rollers 86. Indeed, it is this capability which retains the cutter 22 on the spindle 20.

Very little clearance exists between the rib ring 88 and the opposing surfaces of the spindle 20 and leg 6, so that the rib ring 88, in effect, closes the end of the cavity 62 in the cutter 22. Moreover, the small clearances between the rib ring 88 and the surfaces of the leg 6 and spindle 20 create a labyrinth which, to a large measure, prevents rock cuttings from entering the cavity 62 in the cutter 22. Of course, the constant flow of air through the cavity 62 is exhausted through the small clearance between the rib ring 88 and the spindle 20 and leg 6, and this further excludes the entry of rock cuttings into the cavity 62.

Assembling the rock bit A is a relatively simple procedure. Of course, the cutter 22, which is a separate subassembly itself, is assembled merely by inserting the sleeve bearing 78, the flat thrust bearing 80 and the cup 82 into the small, intermediate, and large bores 64, 66, and 68, respectively. As to the spindle 20, its mounting stub 34 is inserted into the socket 10 of the leg 6 and the retaining pin 44 is fitted transversly through the leg 6 and the stub 34 to secure the spindle 20 to the leg 6. Then, the rib ring 88 is placed loosely on the spindle 20. Next the tapered rollers 86 are placed around the tapered raceway 36 on the enlarged intermediate portion 30 of the spindle 20, there being as many tapered rollers 86 placed over the raceway 36 as possible. The rollers 86 are temporarily retained in place by using a suitable grease between the rollers 86 and the tapered raceway 36. Thereafter, the assembled cutter 22 is fitted over the spindle 20, and as it is advanced, the journal 32 enters the sleeve bearing 78, while the cup 82 embraces the row of tapered rollers 86. The threads 76 at the large end of the rear bore 68 in the cutter 22 are engaged with threads on the rib ring 88 which is held firmly against rotation by inserting a tool through the slot 11 in the leg 6 and into the axial hole 91 in the back of the rib ring 88. Then the cutter 22 is turned so as to move the frontface 45 of the cup 82 toward the rib ring 88. The advancement continues until the flat thrust bearing 80 comes against the front shoulder 40 on the spindle 20. In this condition the thrust rib 90 on the front of the rib ring 88 will bear against the large diameter ends of the tapered rollers 86 and the bearing 92 will be in a condition of predetermined bearing setting. Finally, the three legs 6, or more specifically the three segments of the body 2, are joined together to complete the body 2 of the bit A as well as the bit A itself.

OPERATION

To drill a hole in a rock formation with the roller-type rock bit A, the bit at the shank 4 on its body 2 is attached to the lower end of a hollow drill rod, and the rod is simultaneously rotated and forced downwardly. This produces a drill hole. As the bit A rotates in the drill hole, the teeth of the three cutters 22 bear against the bottom of the drill hole and chisel, pulverize, and otherwise gnaw away at the rock formation, making the hole deeper. More specifically, as the body 2 of the bit A revolves, the three legs 6 describe a circle, while the spindles 20 on those legs 6 move around the axis X. The cutters 22 on the spindles 20 roll along the bottom of the drill hole, and as a consequence the cutters 22 revolve about their respective spindles 20. Since the spindles 20 are directed downwardly from their respective legs 6 at an oblique angle with respect to the axis X, substantial thrust and radial loads are exerted on each spindle 20 with the thrust load being directed outwardly toward the leg 6. Some of the radial load is taken by a sleeve bearing 78 at the small end of the cutter 22, but most of it is taken by the tapered roller bearing 92, this radial load being transferred between the two raceways 36 and 84 generally transversely through the tapered rollers 86. Since the rollers 86 are tapered, the radial load tends to expel them from the space between the two raceways 36 and 84, but the expulsion force is resisted by the thrust rib 90 on the rib ring 88. The tapered roller bearing 92 and the flat thrust bearing 80 share the thrust load. Like the radial load, this thrust load insofar as the tapered roller bearing 92 is concerned, is transferred between the raceways 36 and 84 generally transversely through the tapered rollers 86. As a consequence, the thrust load tends to seat the rollers 86 against the tapered raceways 36 and 84.

While the bit A rotates within the drill hole, compressed air is directed into its shank 4. Some of this air discharges from the nozzles 14 as air blasts which help dislodge cuttings from the spaces between the teeth 60 of the three cutters 22. The remainder of the compressed air flows through the legs 6, passing through the ducts 12 therein to the sockets 10 at the ends of the legs 6. From the socket 10 in each leg 6, the air flows through the passages 46 and 48 in the spindle 20 to the end face of journal 32 and to the front shoulder 40. The air which discharges from the end of the journal 32 flows through the axial slot 50 in the surface of the journal 32, and then passes outwardly through the radial slot 52 in the front shoulder 40. Here it joins the air discharged from the front shoulder 40 and the combined airstreams then flow through the tapered roller bearing 92. The air discharges from the cutter 22 through the small clearance between the rib ring 88 and the opposing surfaces of the spindle 20 and the leg 6. This constant flow of air coupled with the labyrinth created by the closely fitted rib ring 88 prevents rock cuttings from entering the cavity 62 of the cutter 22 and destroying the bearings 78, 80 and 92 in that cavity. Ideally, a slight oil mist may be introduced into the airstream to provide lubrication for the bearings 78, 80 and 92.

MODIFICATIONS

In lieu of the separate sleeve bearing 78 and flat thrust bearing 80, the two may be united into a single bearing 102 (FIG. 5) that is pressed into the small forward bore 64 of the cutter 22. Also, the tapered raceway 84 for the spindle 20 need not be formed directly on the surface of the spindle 20, but may be on a cone 104 that is fitted over a reduced intermediate portion 106 on the spindle 20. Also, it is desirable to taper the bore of the cone 104 and the surface of the intermediate portion 106 over which the cone 104 fits, such that those tapered surfaces converge slightly toward the mounting stub 34. This provides a means for setting the bearing 92, for it enables the cone 104 to be expanded in the radial direction to remove internal clearances in the bearing 92. For example, if too much radial clearance exists in the bearing 92, the cone 104 is pressed further over the intermediate portion 106 so as to expand it. The separate cone 104 also permits the spindle 20 to be reused if the cone 104 of the bearing 92 is damaged, for the cone 104 need only be pressed off the spindle 20 and be replaced with a new cone 104.

Finally, the rib ring 88 need not be threaded into the large bore 68, but may be retained by any suitable means, such as a locking pin 110 pressed into aligned bores 112 and 114 in the cutter 22 and rib ring 88, respectively, with the midpoint of the pin 110 being at the surface of the large rear bore 68. The bore 114 in the rib ring 88, however, extends radially inwardly a distance greater than the length of the pin 110 so that the pin 110 can be driven fully into that bore to free the rib ring 88 for removal from the cutter 22. Preferably three pins 110 spaced at 120° intervals are employed to secure the rib ring 88.

This invention is intended to cover all changes and modifications of the example of the invention herein chosen for pusposes of the disclosure which do not constitute departures from the spirit and scope of the invention.

What is claimed is:

1. In a roller type rock bit having a body adapted to rotate in a drill hole, the improvement comprising: a spindle projected from the body and having both a shoulder and a journal located beyond the body; a generally coneshaped cutter surrounding the spindle and having large and small ends and a cavity opening out of its large end, with the spindle being projected into the cavity from the large end of the cutter, the cutter further having a shoulder located opposite the shoulder on the spindle and external cutting elements arranged to bear against the end of the drill hole; an inner tapered raceway fixed in position with respect to the spindle and located beyond the shoulder on the spindle; an outer tapered raceway fixed in position with respect to the cutter; a single row of tapered rollers between the two raceways with the rollers having their tapered side surfaces against those raceways and their small diameter ends presented toward the small end of the cutter; a first rib fixed in position with respect to the spindle and projected outwardly from the tapered raceway thereon, the first rib being located opposite the small diameter ends of the tapered rollers; a second thrust rib fixed in position with respect to the cutter and located adjacent to the tapered raceway on the cutter, the second rib being located opposite the large diameter ends of the tapered rollers so that the rollers are captured between the two ribs, whereby a thrust load applied in the direction which urges the thrust ribs together is transferred through the ribs and generally axially through the rollers, while a thrust load applied in the direction which urges the ribs apart is transferred through the raceways and generally transversely through the rollers; a bearing carried by the cutter and receiving the journal of the spindle to transfer radial loads between the cutter and spindle; and a thrust bearing located between the shoulders of the spindle and the cutter to take thrust loads applied to the cutter in the direction which urges the thrust ribs at the ends of the rollers away from each other.

2. The structure according to claim 1 wherein the outer tapered raceway is formed on a bearing cup fitted into the cavity of the cutter and the thrust rib is on a backing ring that fits against the cup.

3. The structure according to claim 2 wherein the tapered raceway for the spindle is formed integral with the spindle.

4. The structure according to claim 1 wherein the body contains an air duct which extends to the spindle and the spindle contains an air passage which opens into the cavity of the cutter beyond the small diameter ends of the rollers so that air discharged into the air passage of the spindle will escape between the rollers and flush dirt from the cavity.

5. The structure according to claim 4 wherein the air passage of the spindle opens into the cavity at the end of the journal, and the journal and shoulder on the spindle contain slots to permit air to escape past the sleeve and flat bearing.

6. The structure according to claim 1 wherein the shoulder on the spindle is located between the small end of the tapered raceway for the spindle and the journal on the spindle.

7. The structure according to claim 1 wherein the thrust rib at the large ends of the rollers is detachable from the cutter.

8. The structure according to claim 1 wherein the spindle projects from a leg on the body and is detachable from the leg.

9. In a roller-type rock bit having a body adapted to rotate in a drill hole and axially directed legs, the improvement comprising: a spindle mounted on each leg and extended inwardly therefrom toward the axis of the bit with the spindle axis being at an oblique angle to the bit axis, the spindle having a mounting stub that is connected with the leg, an intermediate portion beyond the stub, a cylindrical journal beyond the intermediate portion, and a shoulder between the intermediate portion and the journal; a cone-shaped cutter having rock cutting or pulverizing elements along its external surface and an internal cavity which opens out of one end of the cutter and receives the spindle, the cutter further having a shoulder located opposite to the shoulder on the spindle; a sleeve bearing in the cutter and surrounding the journal on the spindle; a first tapered raceway surrounding and carried by the intermediate portion of the spindle and a second tapered raceway carried by the cutter and surrounding the first tapered raceway, the tapered raceways having their small diameter ends presented toward the cylindrical journal and their large diameter ends presented toward the end of the cavity that opens outwardly; a single row of tapered rollers between the first and second tapered raceways and having their tapered side faces against the tapered raceways, a first thrust rib on the spindle and located opposite the small diameter ends of the tapered rollers; a second thrust rib in the cavity of the cutter and located opposite the large diameter ends of the tapered rollers, the second thrust rib being removable from the cavity; and a thrust bearing in the cavity between the shoulders on the spindle and the cutter to accommodate thrust loading applied to the cutter in the direction that urges the cutter toward the leg.

10. In a roller type rock bit having a body adapted to rotate in a drill hole, the improvement comprising: a spindle projected from the body and having a tapered intermediate portion provided with a tapered surface that converges toward the body; a generally cone-shaped cutter surrounding the spindle and having large and small ends and a cavity opening out of its large end, with the spindle projecting into the cavity from the large end of the cutter, the cutter further having external cutting elements arranged to bear against the end of the drill hole; a bearing cone fitted around the spindle and having a tapered bore, the taper of which matches the taper on the intermediate portion of the spindle, the cone further having an inner tapered raceway that is fixed in position with respect to the spindle; a bearing cup fitted into the cavity of the cutter and having an outer tapered raceway that is fixed in position with respect to the cutter; a single row of tapered rollers between the two raceways with the rollers having their tapered side surfaces against those raceways and their small diameter ends presented toward the small end of the cutter; a first rib fixed in position with respect to the spindle and projected outwardly from the tapered raceway thereon, the first rib being located opposite the small diameter ends of the tapered rollers; a backing ring fitted against the cup and being detachable from the cutter, the backing ring having a second thrust rib on it with that thrust rib being fixed in position with respect to the cutter and located adjacent to the tapered raceway on the cup, the second rib being located opposite the large diameter ends of the tapered rollers so that the rollers are captured between the two ribs, whereby a thrust load applied in the direction which urges the thrust ribs together is transferred through the ribs and generally axially through the rollers, while a thrust load applied in the direction which urges the ribs apart is transferred through the raceways and generally transversely through the rollers.

* * * * *